United States Patent
Kuwabara et al.

(10) Patent No.: US 8,198,596 B2
(45) Date of Patent: Jun. 12, 2012

(54) IMAGING SYSTEM AND IMAGE DEFECT CORRECTING METHOD

(75) Inventors: Takao Kuwabara, Kanagawa (JP); Nobuyuki Iwasaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 517 days.

(21) Appl. No.: 12/385,349

(22) Filed: Apr. 6, 2009

(65) Prior Publication Data
US 2009/0252397 A1    Oct. 8, 2009

(30) Foreign Application Priority Data

Apr. 7, 2008  (JP) ................................. 2008-099160

(51) Int. Cl.
*G01T 1/24* (2006.01)
*H04N 9/64* (2006.01)
*G06K 9/46* (2006.01)

(52) U.S. Cl. .................... 250/370.08; 348/247; 382/246

(58) Field of Classification Search .................. 382/128, 382/141, 166, 212, 217, 246, 260, 275; 348/241, 348/246, 247; 250/208.1, 559.05, 559.07, 250/370.08, 370.09
See application file for complete search history.

(56) References Cited

U.S. PATENT DOCUMENTS

| | | | | |
|---|---|---|---|---|
| 5,920,382 A | * | 7/1999 | Shimizu et al. | 356/3.14 |
| 2002/0191101 A1 | * | 12/2002 | Sakurai et al. | 348/346 |
| 2003/0063202 A1 | * | 4/2003 | Toyoda et al. | 348/246 |
| 2006/0103899 A1 | * | 5/2006 | Wu | 358/504 |
| 2009/0010394 A1 | * | 1/2009 | Watanabe | 378/145 |

* cited by examiner

*Primary Examiner* — Georgia Y Epps
*Assistant Examiner* — Don Williams
(74) *Attorney, Agent, or Firm* — Jean C. Edwards; Edwards Neils PLLC (57) ABSTRACT

An imaging system comprises: an imaging unit for producing an image within a given field of view; an image defect detector for detecting a defective area from a first image that is produced by the imaging unit without a subject in the given field of view; a size enlarging unit for forming a deemed defective area having an enlarged size consisting of pixels of the first image corresponding to a defective area detected by the image defect detector and at least one of pixels adjacent to these pixels; and an image defect correcting unit for correcting a second image produced by the imaging unit with a subject located within the given view of field according to a deemed defective area formed by the size enlarging unit.

12 Claims, 4 Drawing Sheets

IMAGING SYSTEM AND IMAGE DEFECT CORRECTING METHOD

CROSS-REFERENCE TO RELATED APPLICATION

This application claims priority under 35 USC 119 from Japanese Patent Application 2008-099160, filed Apr. 7, 2008, the disclosure of which is incorporated herein by reference in its entirety.

The entire contents of literature cited in this specification are incorporated herein by reference.

BACKGROUND OF THE INVENTION

The present invention relates to an imaging system for imaging a subject and more particularly to an imaging system and an image defect correcting method for correcting an image defect of a radiographic image produced by a radiographic imaging system that uses a flat-panel radiation detector.

Radiographic image detectors that detect radiation (e.g., X-ray, alpha ray, beta ray, gamma ray, electron beam, and ultraviolet ray) that has penetrated a subject as an electric signal are conventionally used to produce diagnostic images in medicine or to conduct nondestructive tests in industry.

The radiographic image detectors are exemplified by a radiation detector, i.e., a so-called flat panel detector hereinafter referred to also as FPD, which converts radiation into an electric image signal, and an X-ray image display that converts a radiographic image into a visible image.

The type of radiographic image detector using an FPD includes, for example, a direct type that, in a manner, converts radiation directly into an electric signal by reading as an electric signal electron-hole pairs generated by a photoconductive film such as one formed of amorphous selenium in response to incident radiation.

One of the causes responsible for image degradation of radiographic images produced by a radiographic imaging system using such an FPD is defective pixels of the FPD.

All of the pixels or radiation detecting elements of the FPD do not necessarily produce an output signal having a proper intensity (density) in relation to the amount of incident radiation; there may be defective pixels that produce an output signal with a lower or higher intensity than is appropriate in relation to the radiation applied, which is attributable, for example, to defects that occur in manufacture.

As will be expected, defective pixels fail to produce a proper radiographic signal. Images corresponding to such defective pixels (image defect) may cause serious problems such as false diagnosis.

In addition, defective pixels of the FPD tend to increase with the number of times radiographic images are taken.

It is therefore a normal practice with a radiographic imaging system using an FPD to have located defective pixels of the FPD at a given timing and, when actually taking a radiographic image, correct the image defect by using data of neighboring pixels (the corresponding image data) according to the defective pixel detection results to ensure that a radiographic image of which the image defect has been corrected is displayed or printed out by way of reproduction for diagnosis or other purposes.

To detect defective pixels of an FPD, one may, for example, employ a method using a radiographic image to detect an image defect in the radiographic image and detect the defective pixels of the FPD corresponding to that image defect.

Such a method for detecting defective pixels of an FPD, however, may fail to detect an image defect in a radiographic image (radiographic image data) with an optimum size because of noises such as random noise.

When an image defect in a radiographic image cannot be detected with an optimum size, appropriate correction of the image defect in the radiographic image is impossible.

In addition, when detecting defective pixels of the FPD by the above method, there are cases where the area of the defective pixels of the FPD is found to have grown larger at the time when a radiographic image that needs image defect correction, i.e., a radiographic image of a subject, is taken as compared with the time when a radiographic image used for detecting an image defect was taken.

In such cases, even when the area where an image defect will occur is previously detected with an appropriate size, the size of the image defect in the radiographic image representing a subject may be larger than that of the image defect in the radiographic image used for image defect detection so that the area where image defect correction is effected may not be large enough to cover the area of the actual image defect, thus failing to provide an appropriate image defect correction.

SUMMARY OF THE INVENTION

Failure to appropriately correct an image defect in a radiographic image of a subject allows a part of an image defect to remain in a diagnostic image. Naturally, the area containing an image defect fails to produce an appropriate radiographic image, which may cause serious problems such as a false diagnosis.

It is an object of the present invention to provide an imaging system and an image defect correcting method whereby an image defect in a radiographic image can be appropriately corrected to prevent false diagnosis and the like.

An imaging system according to the invention comprises: an imaging unit for producing an image within a given field of view; an image defect detector for detecting a defective area from a first image that is produced by the imaging unit without a subject in the given field of view; a size enlarging unit for forming a deemed defective area having an enlarged size consisting of pixels of the first image corresponding to a defective area detected by the image defect detector and at least one of pixels adjacent to these pixels; and an image defect correcting unit for correcting a second image produced by the imaging unit with a subject located within the given view of field according to a deemed defective area formed by the size enlarging unit.

A method of correcting an image defect according to the invention comprises the steps of: producing a first image without a subject in a given field of view; detecting a defective area from the first image; forming a deemed defective area having an enlarged size and consisting of pixels of the first image corresponding to a detected defective area and at least one of pixels adjacent to those pixels; producing a second image with a subject in the given field of view; and correcting the second image based upon the deemed defective area.

BRIEF DESCRIPTION OF THE DRAWINGS

This and other objects, features, and advantages of the present invention will be apparent from the following detailed description and accompanying drawings in which.

DETAILED DESCRIPTION OF THE INVENTION

Figure 1:
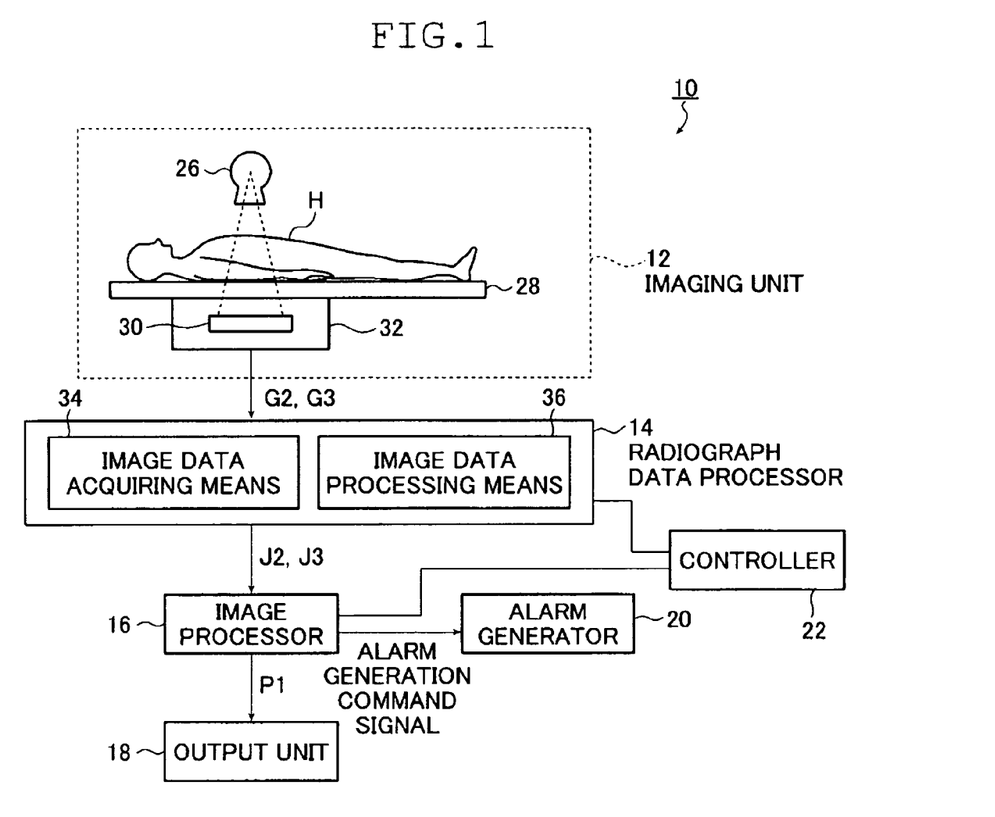
FIG. 1 is a block diagram illustrating a configuration of the radiographic imaging system according to one embodiment of the invention.

FIG. 1 is a block diagram illustrating a configuration of an embodiment of a radiographic imaging system. A radiographic imaging system (hereinafter referred to also as imaging system) 10 illustrated in FIG. 1 irradiates a subject H with radiation, and detects and converts the radiation that has penetrated the subject H into an electric signal corresponding to image data thereby to produce a radiographic image of the subject H based upon the electric signal obtained by conversion.

The imaging system 10 comprises an imaging unit 12, a radiograph data processor 14, an image processor 16, an output unit 18, an alarm generator 20, and a controller 22.

The imaging unit 12 irradiates the subject H with radiation and detects the radiation that has passed through the subject H thereby to radiograph the subject H. The imaging unit 12 outputs radiographic image data (analog data) of the subject H.

The imaging unit 12 will be described later in detail.

The radiograph data processor 14 performs data processings such as analog-to-digital conversion on the radiographic image data supplied from the imaging unit 12. The radiograph data processor 14 outputs radiographic image data (digital data) that has undergone data processings.

The radiograph data processor 14 will be described later in detail.

The image processor 16 performs image processings including image defect correction according to the image defect correcting method of the invention on the processed radiographic image data supplied from the radiograph data processor 14.

The image processor 16 comprises programs (software) that run in a computer or dedicated hardware or a combination of both.

The image processor 16 outputs image-processed radiographic image data P1 and a signal that activates the alarm generator 20 (referred to as alarm generation command signal below).

The image processor 16 will be described later in detail.

The output unit 18 outputs the image-processed radiographic image data P1 supplied from the image processor 16.

The output unit 18 may be, for example, a monitor for displaying a radiographic image on the screen, a printer for printing a radiographic image, or a memory for storing radiographic image data.

The alarm generator 20 gives notification of the time for replacing the flat-panel radiation detector, which will be described later in detail, according to the alarm generation command signal. The alarm generator 20 may, for example, be a display panel that gives notification of the time for replacing the flat-panel radiation detector.

The controller 22 controls the operations of the imaging system 10.

For example, the controller 22 controls image data acquisition by the radiograph data processor 14 and further provides control such that image processing and production of the image-processed radiographic image data P1 are accomplished by the image processor 16.

Now, the imaging unit 12 will be described.

The imaging unit 12 comprises a radiation source 26, a radiographic table 28, and imaging means 32.

The imaging means 32 comprises a flat-panel radiation detector 30 (also referred to as FPD 30 below) for producing a radiographic image.

As with a normal radiographic imaging system, the imaging system 10 receives radiation that, radiated by the radiation source 26, has passed through the subject H on the light-receptive surface of the FPD 30 and produces a radiographic image of the subject H through photoelectric conversion of that radiation.

The FPD 30 may be a conventional FPD used in radiographic imaging systems such as, a so-called direct-type FPD employing a photoconductive film such as one formed of amorphous selenium and a thin-film transistor to collect electron-hole pairs generated by the photoconductive film in response to incident radiation and read them out as an electric signal using the TFT.

Besides the FPD 30, the imaging means 32 may comprise other components with which known radiographic imaging systems are equipped such as, for example, a grid for shielding scatter radiation that would otherwise enter the FPD 30 and grid moving means.

The output signal (image data) representing a radiographic image produced by the FPD 30 of the imaging means 32 is supplied to the radiograph data processor 14.

Although not shown, the radiation source 26 and the imaging means 32 are so configured, for example, as to be capable of reciprocating along the length of the radiographic table 28 (leftwards and rightwards in FIG. 1) to allow elongate radiographs to be taken. Alternatively, the radiographic table 28 may be movably provided.

Now, the radiograph data processor 14 will be described.

The radiograph data processor 14 comprises image data acquiring means 34 and image data processing means 36.

The image data acquiring means 34 acquires image data read from the FPD 30 and supplies the image data to the image data processing means 36.

According to this embodiment, the image data acquiring means 34 acquires image data read from the FPD 30 after the radiation source 26 evenly irradiated (exposed to radiation) the FPD 30 without passing through the subject H (also referred to as radiation-exposed image data G2 below) and image data read from the FPD 30 after the radiation source 26 irradiated the subject H (also referred to as subject image data G3 below). Then the image data acquiring means 34 supplies the image data G2 and G3 to the image data processing means 36.

The image data processing means 36 performs data processings such as analog-to-digital conversion on the image data G2 and G3 supplied from the image data acquiring means 34 and supplies the data-processed image data after data processing (digital data) to the image processor 16.

Note that in this embodiment, the data-processed radiation-exposed image data G2 is also referred to as processed radiation-exposed image data J2, and the data-processed subject image data G3 is also referred to as processed subject image data J3.

Now, the image processor 16 will be described in detail.

Figure 2:
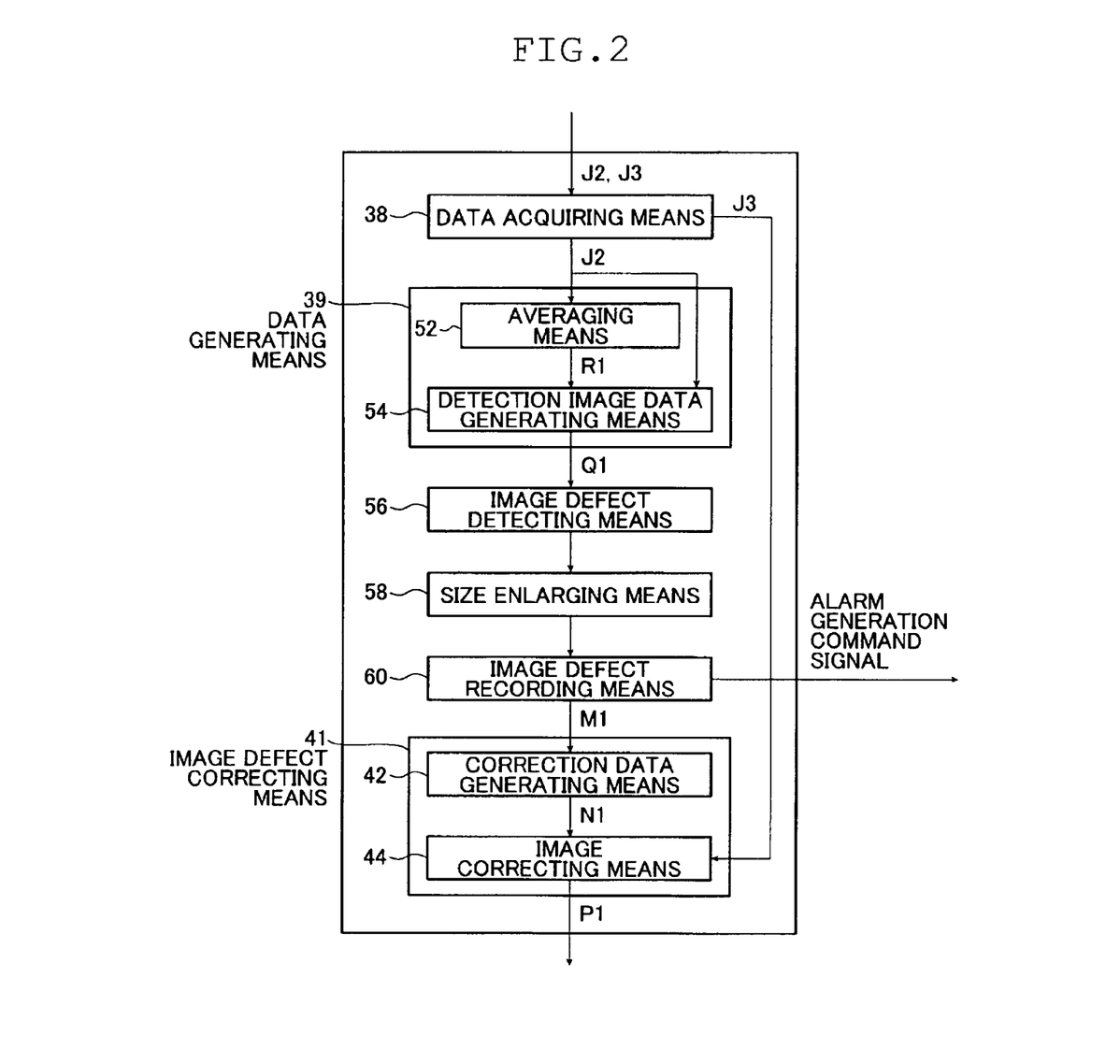
FIG. 2 is a block diagram illustrating a configuration of an image processor.

FIG. 2 is a block diagram illustrating a configuration of the image processor 16 of FIG. 1.

The image processor 16, as illustrated in FIG. 2, comprises data acquiring means 38, data generating means 39, image defect detecting means 56, size enlarging means 58, image defect recording means 60, and image defect correcting means 41.

The data acquiring means 38 acquires the processed radiation-exposed image data J2, and the processed subject image data J3 supplied from the radiograph data processor 14 and supplies the processed radiation-exposed image data J2 to the data generating means 39 and the processed subject image data J3 to the image defect correcting means 41.

The data generating means 39 uses the processed radiation-exposed image data J2 to produce and supply image data for detecting an image defect in a radiographic image (also referred to as image defect detection image data Q1 below) to the image defect detecting means 56.

The data generating means 39 will be described later in detail.

The image defect detecting means 56 is an image defect detector in the invention and detects a defective area or defective pixels from the image defect detection image data Q1.

Detection of a defective area may be performed by any of the methods used with various radiographic imaging systems including but not limited to a method whereby a pixel that outputs a signal that is lower or higher than a preset threshold is detected upon irradiation.

The size enlarging means 58 is a size enlarging unit in the invention. It adds at least one of the pixels in the FPD 30 located adjacent to pixels in the FPD 30 corresponding to a defective area detected by the image defect detecting means 56 to obtain a deemed defective area having an enlarged size.

A more specific description will now be made about the formation of a deemed defective area performed by the size enlarging means 58 referring to the scheme given in FIG. 3.

Figure 3:
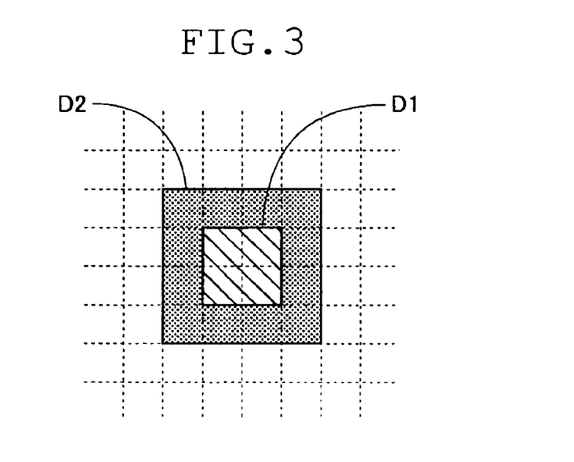
FIG. 3 is a view for explaining how a deemed defect area is formed.

As illustrated in FIG. 3 by way of example, when a defective area D1 detected from radiographic image data is a image defect having a size of 2 pixels×2 pixels in the FPD 30, the size enlarging means 58 treats at least one of the pixels in a region D2 located adjacent to the defective area D1 as a defective pixel and adds the at least one pixel to the defective area D1 thereby to obtain a deemed defective area having an enlarged size.

The size enlarging means 58 may treat all the pixels in the area D2 adjacent to the defective area D1 as defective pixels and add them to the defective area D1. Further, pixels located outside of the area D2 may be treated as defective pixels and added to form a deemed defective area.

Using a deemed defective area having an enlarged size that is formed as described above, an appropriate correction can be made without allowing any image defect to remain in the radiographic image since the area determined for correction is not too small even when the defective area of the radiographic image could not be detected with an optimum size because of noises or other causes and even when a detected defective area was smaller than the defective area to be corrected.

In this embodiment, the size enlarging means 58 moreover determines the kind of a defect area detected by the image defect detecting means 56 and identifies pixels among those that may be defective with a high probability other than the pixels in the FPD 30 corresponding to the detected defective area.

The image defect recording means 60 records information on the defective area detected by the image defect detecting means 56 (number of pixels, their positions, densities, etc.) and information on the deemed defective area formed by the size enlarging means 58 both as defect record data M1.

The image defect recording means 60 also records as defect record data M1 the kinds of defective areas determined by the size enlarging means 58 and information on pixels that are judged to be defective with a high probability.

The defect record data M1 is supplied from the image defect recording means 60 to the image defect correcting means 41.

The image defect recording means 60 produces defect history data from the history of a defective area (defective pixels) recorded as the defect record data M1 and judges whether defective pixels in the FPD 30 tend to increase based upon the defect history data and sends the alarm generation command signal to the alarm generator 20 when the defective pixels in the FPD 30 are predicted to exceed, within a given period of time, a given number over which diagnosis based upon a radiographic image produced using the FPD 30 may be affected.

Conventionally, since alarm was given only after the defective pixels in the FPD 30 have exceeded a given number over which diagnosis may be affected, the FPD 30 needed to be replaced immediately without regard to the state and the like of a diagnosis.

Prediction about the increase of defective areas (defective pixels) in the FPD 30 as described above, however, allows a period of time during which the FPD 30 may be replaced or repaired when the imaging system 10 is not in use.

The prediction about the increase of defective pixels may be made by any method without any specific limitation and preferably made using collinear approximation or exponential approximation, taking the characteristics of the FPD 30 into consideration, where necessary.

The image defect correcting means 41 is an image defect correcting unit in the invention and comprises correction data generating means 42 and image correcting means 44. The image defect correcting means 41 corrects an image defect of a radiographic image of a subject, i.e., a radiographic image represented by the processed subject image data J3.

The image defect correcting means 41 will be described later.

As illustrated in FIG. 2, the data generating means 39 comprises averaging means 52 and detection image data generating means 54.

The averaging means 52 performs averaging on the acquired processed radiation-exposed image data J2 to produce and supply averaged processed radiation-exposed image data J2 (referred to below as averaged data R1) to the detection image data generating means 54. The averaging may be performed by any method including but not limited to a method whereby median filtering is effected to the processed radiation-exposed image data J2 in the main scan direction and then in the auxiliary direction in this order.

The detection image data generating means 54 uses the acquired processed radiation-exposed image data J2 and averaged processed data R1 to produce and supply image defect detection image data Q1 to the image defect detecting means 56. The image defect detection image data Q1 may be produced by any method including but not limited to a method whereby averaged processed data R1 is subtracted from the processed radiation-exposed image data J2.

As described above, the image defect correcting means 41 comprises the correction data generating means 42 and the image correcting means 44.

The correction data generating means 42 uses the defect record data M1 to produce and supply image defect correction data N1 used for correcting a defect area of the radiographic image data (processed subject image data J3) to the image correcting means 44.

The image correcting means 44 corrects the defect area of the processed subject image data J3 supplied from the data acquiring means 38 based upon image defect correction data N1 supplied from the correction data generating means 42. The image correcting means 44 determines the position of defective pixels needing correction based upon the acquired image defect correction data N1 and obtains the average of two normal pixels located adjacent to those defective pixels to produce image data corresponding to the defective image, thereby performing defect correction.

The defect correction may be performed by any method used with various radiographic imaging systems including but not limited to a method whereby image data for defective pixels is produced from the tendency of change observed in pixels in a given area near the defective pixels in addition to the above method whereby the average of adjacent pixels located on both sides of defective pixels or neighboring pixels to produce image data for the defective pixels.

For example, a defective pixel may be corrected using a weighted average calculated from three or more normal pixels near the defective pixel and a distance from these normal pixels to the defective pixel.

In the radiographic imaging system 10 having the above configuration, a deemed defective area having a size enlarged from a detected defective area is formed to enable an appropriate correction without allowing any image defect to remain in the radiographic image since the area determined for correction is not too small even when the defective area of the radiographic image could not be detected with an optimum size because of noises or other causes and even when a detected defective area was smaller than the defective area to be corrected.

This makes it possible to provide accurate diagnoses with high-quality diagnostic images that are highly unlikely to cause false diagnosis and instead.

Now, the effects of the inventive radiographic imaging system 10, an embodiment of the present invention, will be described, which will also explain the image defect correcting method of the invention.

First, the FPD 30 of the imaging unit 12 produces the radiation-exposed image data G2 and the subject image data G3.

The radiograph data processor 14 acquires and converts the image data G2 and G3 into digital data (processed radiation-exposed image data J2 and processed subject image data J3, respectively) and supplies the data to the image processor 16.

The data acquiring means 38 in the image processor 16 acquires the digital data J2 and J3 and supplies the processed radiation-exposed image data J2 to the averaging means 52 and the detection image data generating means 54 of the data generating means 39 on the one hand and the processed subject image data J3 to the image defect correcting means 41 on the other.

Subsequently, the averaging means 52 in the data generating means 39 performs averaging on the processed radiation-exposed image data J2 to produce and supply averaged data R1 to the detection image data generating means 54.

The detection image data generating means 54 uses the averaged data R1 and the processed radiation-exposed image data J2 to produce and supply the image defect detection image data Q1 to the image defect detecting means 56.

The image defect detecting means 56 detects a defective area based upon the image defect detection image data Q1.

Then, the size enlarging means 58 forms a deemed defective area that is enlarged from the detected defective area.

The image defect recording means 60 records information on the deemed defective area formed by the size enlarging means 58 (number of pixels, their positions, densities, etc.) as defect record data M1, which is supplied to the correction data generating means 42 of the image defect correcting means 41. The image defect recording means 60 produces and records defect history data from the history of a defective area (defective pixels) recorded as the defect record data M1.

The correction data generating means 42 uses the defect record data M1 recorded in the image defect recording means 60 to produce and supply the image defect correction data N1 to the image correcting means 44.

Then, the image correcting means 44 corrects the image defect of the processed subject image data J3 based upon the image defect correction data N1 to produce and supply the radiographic image data P1 that has undergone image processing (image defect correction) to the output unit 18.

Finally, the output unit 18 outputs the image-processed radiographic image data supplied from the image correcting means 44.

Figure 4:
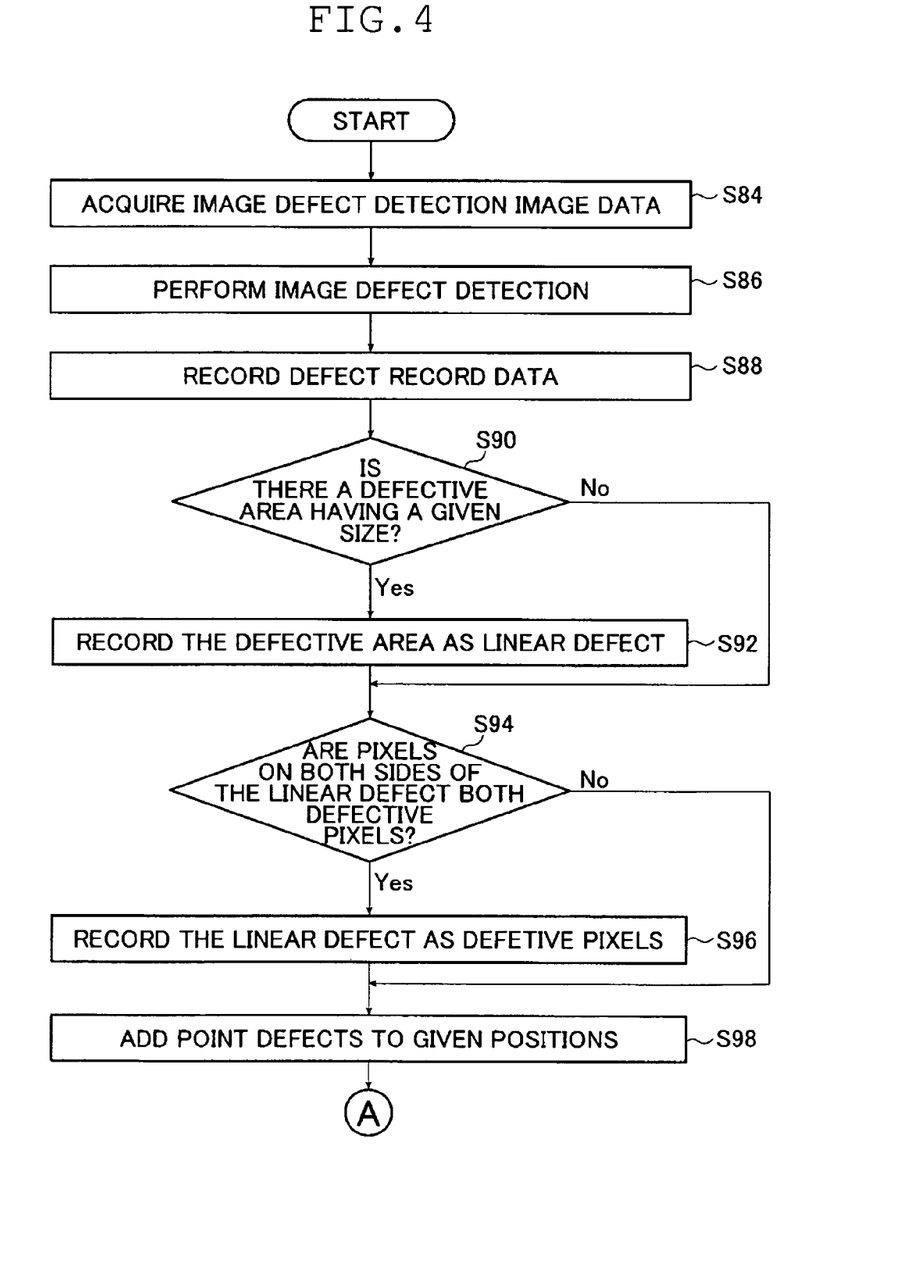
FIGS. 4 and 5 are flow charts illustrating an example of a sequence of processings performed by image defect detecting means, size enlarging means, and image defect recording means.
Figure 5:
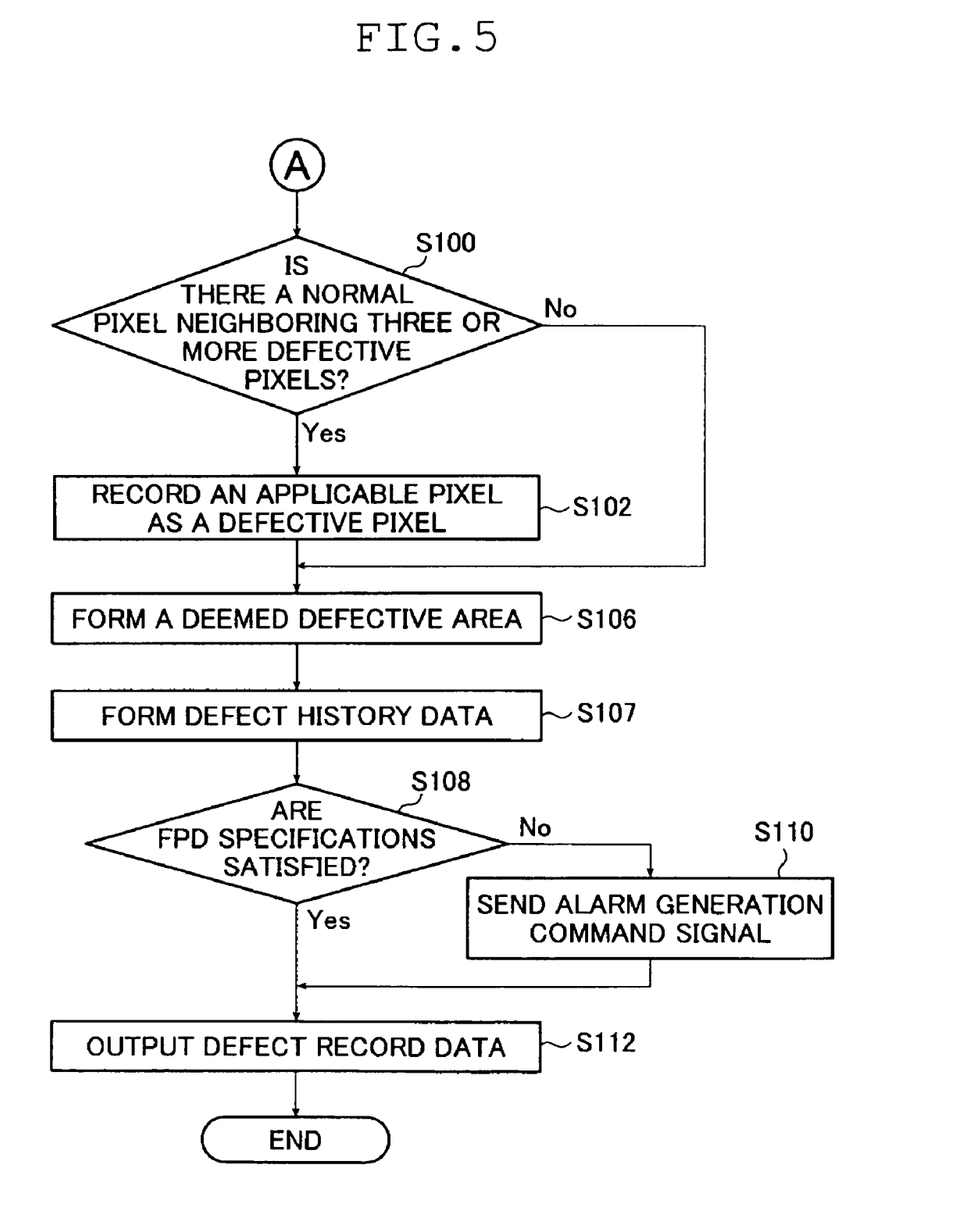

Next, a description will be made of an example of a sequence of processings performed by the image defect detecting means 56, the size enlarging means 58, and the image defect recording means 60.

FIGS. 4 and 5 are flow charts illustrating an example of a sequence of processings performed by the image defect detecting means 56, the size enlarging means 58, and the image defect recording means 60.

First, the image defect detecting means 56 acquires the image defect detection image data Q1 from the data generating means 39 (S84).

Then, the image defect detecting means 56 detects a black defect or a white defect from the image defect detection image data Q1 (S86).

The black defect or the white defect may be detected by any appropriate method including but not limited to a method whereby one creates a threshold table for detecting a black defect and a threshold table for detecting a white defect according to the size of the defective area (area occupied by defective pixels).

In general, when the defective area is small, that is, when the area occupied by defective pixels is small, the defective area is difficult to recognize as an image defect in the radiographic image unless the density of the defective area is significantly high. By contrast, when the defective area is large, that is, when the area occupied by defective pixels is large, the defective area is easy to recognize as an image defect even when the density of the defective area is low. In this embodiment, therefore, different thresholds are used according to the size of the defective area.

In addition, the ease with which an image defect can be recognized as such depends upon whether it is a black defect or a white defect. Accordingly, different thresholds are used in this embodiment for a black defect and a white defect to permit accurate detection thereof.

Specifically, this embodiment uses a detection method whereby black defects and white defects having various sizes are detected using a threshold table for detecting black defects and a threshold table for detecting white defects according to the size of the image defect so that the image defect correction to be performed at a later stage can be made accurately and effectively.

The image defect recording means 60 records the defective area detected in Step S86 in the defect record data M1 (S88).

Then, a judgment is made based upon the defect record data M1 as to the presence or absence of a defective area having a given size, i.e., a width not greater than a first given value and a length not less than a second given value (S90).

When a defective area having a width not greater than the first given value and a length not less than the second given value exits, the defective area is recorded as a linear defect while the recognition thereof as a linear defect is recorded in the defect record data M1 (S92).

A linear defect herein denotes a defective area such that continuous defective pixels extend linearly (e.g., 3 pixels wide or less and 21 pixels long or more) whereas a point defect denotes a defect that is not a linear defect, an example of which is a defect formed by a cluster of defective pixels.

Thus, identifying a defective area satisfying the above conditions as a linear defect permits identification of an unstable point defect, which was recognized conventionally as a dotted-line, as a linear defect. This allows an appropriate image defect correction to be accomplished in steps to follow.

The image defect detecting means 56 uses the data that has been recorded as a linear defect to judge whether the pixels located on both ends of the linear defect are both defective pixels (S94).

When the pixels located on both ends of the linear defect are both defective pixels, the area between these pixels are also recognized as defective pixels and recorded as such (S96).

When there is a severed linear defect, it is possible that pixels located close to the severed ends of the linear defect are also abnormal. Accordingly, the image defect detecting means 56 uses the data that has been recorded as a linear defect to add a point defect having a given size to each of the positions corresponding to the severed ends of the severed linear defect and record the addition of the point defects in the defect record data M1 (S98).

Then, the image defect detecting means 56 judges based upon the defect record data M1 whether there is a normal pixel adjacent to which there are three or more defective pixels (S100).

Such a normal pixel is highly likely to be a defective pixel that has escaped detection due to noises such as random noise. Accordingly, when a judgment is made in Step S100 that there is a normal pixel having three or more defective pixels among the pixels located above and below it, and on the right and left-hand sides thereof, the normal pixel is recorded as a defective pixel of the FPD 30 (S102).

Then, the size enlarging means 58 forms a deemed defective area (106). That is, a normal pixel adjacent to a defective area is detected from the defect record data M1, and the normal pixel is treated as a defective pixel and recorded in the defective record data M1.

The directions in which pixels adjacent to a defective area are detected are not limited specifically; the detection may be made in one direction of upwards, downwards, rightwards and leftwards of the defective area of interest or in any possible combination of these directions. This allows formation of a deemed defective area as enlarged in a direction or directions such as the horizontal direction, the vertical direction, or only the downward direction depending upon the characteristics of the FPD 30.

Note that dense point defects, for example, may grow significantly larger than those as detected whereas point defects having a low density may not grow in size. Further, point defects larger than a given size may grow larger whereas those smaller than a given size may not grow in size. The manner in which defects grow in size varies with the characteristics of the FPD. Accordingly, an optimum deemed defective area can be formed by having previously examined the characteristics of the FPD to determine the number of normal pixels adjacent to a defective area that should be treated as defective pixels according to the density and size of the defective area.

Next, the image defect recording means 60 produces a defect history data from the history of a defective area (defective pixels) recorded as the defect record data M1 (107).

Further, the image defect recording means 60 verifies based upon the defect record data M1 whether the size of the defective area (defective pixels), the density thereof in unit area, and the number of the defective pixels satisfy the specifications of the FPD 30 (specifications permitting its use for diagnosis) (108).

When the specifications are not satisfied, the alarm generation command signal is sent to the alarm generator 20 (S10).

Subsequently, the image defect recording means 60 supplies the defect record data M1 to the correction data generating means 42 (S112).

In this embodiment, the image defect detecting means 56 detects a defective area based upon the image defect detection image data Q1. However, the invention is not limited this way and permits detection of a defective area from the processed radiation-exposed data J2.

In this embodiment, the specifications of the FPD 30 are verified in Step S108 after the deemed defective area is formed in Step S106. The invention is not limited this way, however, and permits formation of the deemed defective area after verification of the specifications of the FPD 30.

In this embodiment, the image processing means 44 performs only the image defect correction but the invention is not limited this way. The image processing means 44 may be adapted to perform other image processings performed in various radiographic imaging systems such as, for example, offset correction (dark correction) and gain correction (shading correction) performed along with image defect correction, tone correction and density correction according to calibration, and even data conversion whereby image data is converted into data for monitoring and printing.

In this embodiment, the image defect recording means 60 identifies as a linear defect a defective area having a width not greater than the first given value and a length not less than the second given value but the invention is not limited this way. According to the invention, a read-out line containing defective pixels in a proportion exceeding a given ratio, say about 10% or more, may be identified as a linear defect.

Thus, identifying a read-out line that contains defective pixels in a proportion exceeding a given ratio as a linear defect permits identification of an unstable linear defect, which was conventionally recognized as a dotted line, as a linear defect. This allows an appropriate image defect correction to be accomplished in steps to follow.

Note that the size of a point defect varies with the read control conditions such as the amount of radiation applied and the length of time during which a voltage is applied. For example, the greater the amount in which radiation is applied to the FPD, the larger the point defect may grow or, conversely, the smaller it may grow. Further, the longer a voltage is applied to the photoconductive film, the larger the point defect grows. Accordingly, this embodiment allows for an enlargement of a detected point defect but the invention is not limited this way. Enlargement of a point defect may not be allowed for at the time of detection thereof but when correcting the image defect, the number of pixels treated as defective pixels may be determined from the average of normal pixels located adjacent to the point defect to achieve correction. Alternatively, the number of pixels treated as defective pixels may be determined according to the read control conditions such as the amount of radiation applied to the FPD and the length of time during which a voltage is applied thereto.

Further, a defect record database may be provided to store information on detected defect areas and deemed defect areas formed therefrom (number of pixels, their positions, densities, etc.) as defect record data M1.

While the inventive radiographic imaging method has been described with reference to a specific embodiment, it is to be understood that various changes and modifications may be made without departing from the spirit of the invention. Needless to say, the present invention can also be applied to point defects in systems such as digital cameras for producing visible images.

What is claimed is:

1. An imaging system comprising:
    an imaging unit for producing an image within a given field of view;
    an image defect detector for detecting a defective area consisting of at least one defective pixel from a first image that is produced by the imaging unit without a subject in the given field of view;
    a deemed defective area forming unit for forming a deemed defective area having an enlarged size by adding at least one normal pixel as deemed to be defective adjacent to the at least one defective pixel of the first image corresponding to the defective area detected by the image defect detector to the at least one defective pixel corresponding to the defective area; and
    an image defect correcting unit for correcting a second image produced by the imaging unit with a subject located within the given view of field according to a deemed defective area formed by the deemed defective area forming unit.

2. The system according to claim 1 further comprising:
    a defect record database, and
    an image defect recorder for recording information in the defect record database as to the defective area detected by the image defect detector and the deemed defective area formed by the deemed defective area forming unit.

3. The system according to claim 2, wherein
    the imaging unit produces an image using a solid-state image sensor, and
    the image defect recorder identifies as a linear defect a read-out line read by the solid-state image sensor where pixels corresponding to the defective area exceed a given ratio.

4. The system according to claim 3, wherein the solid-state imaging sensor is a flat-panel type radiation detector and the imaging system is a radiographic imaging system for producing a radiographic image of the subject.

5. The system according to claim 4, wherein the image defect detector detects a defective area of the radiographic image from radiographic image data that is obtained by the radiation detector after the radiographic image is produced without a subject in the given field of view.

6. The system according to claim 2 further comprising an alarm generator,
    the image defect recorder storing a history of information as to the defective areas to predict a rate at which the size of the defective area, the number of its pixels and the density thereof in unit area increase and causing the alarm generator to generate an alarm when at least one prediction value as to the size of the defective area, the number of its pixels and the density thereof in unit area exceeds a given threshold.

7. The system according to claim 1, wherein the image defect detector subtracts image data obtained by performing one of median filtering and moving average processing on the first image data from the first image data to detect the defective area from the first image.

8. The system according to claim 1, wherein the at least one normal pixel added to the at least one defective pixel by the deemed defective area forming unit is adjacent to the at least one defective pixel corresponding to the defective area in at least one direction of upwards, downwards, rightwards and leftwards of the defective area.

9. The system according to claim 1, wherein the deemed defective area forming unit forms a deemed defective area after the imaging unit produces the second image.

10. A method of correcting an image defect comprising the steps of:
    producing a first image without a subject in a given field of view;
    detecting a defective area consisting of at least one defective pixel from the first image;
    forming a deemed defective area having an enlarged size by adding at least one normal pixel as deemed to be defective adjacent to the at least one defective pixel of the first image corresponding to the detected defective area to the at least one defective pixel corresponding to the defective area;
    producing a second image with a subject in the given field of view; and
    correcting the second image based upon the deemed defective area.

11. The method according to claim 10, wherein the deemed defective area is formed after the second image is produced.

12. The method according to claim 10, wherein the first image and the second image are radiographic images produced using a flat-panel type radiation detector.

* * * * *